United States Patent
Reschka et al.

(10) Patent No.: US 9,501,347 B2
(45) Date of Patent: Nov. 22, 2016

(54) DOCUMENTATION OF FAULTS IN A FAULT MEMORY OF A MOTOR VEHICLE

(71) Applicant: Bayersiche Motoren Werke Aktiengesellschaft, Munich (DE)

(72) Inventors: Markus Reschka, Unterfoehring (DE); Stefan Jurthe, Holzkirchen (DE); Tobias Kraeker, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 211 days.

(21) Appl. No.: 14/148,168

(22) Filed: Jan. 6, 2014

(65) Prior Publication Data
US 2014/0122944 A1    May 1, 2014

Related U.S. Application Data (63) Continuation of application No. PCT/EP2012/062581, filed on Jun. 28, 2012.

(30) Foreign Application Priority Data

Jul. 7, 2011 (DE) .................. 10 2011 078 793

(51) Int. Cl.
*G06F 11/00* (2006.01)
*G06F 11/07* (2006.01)
(Continued)

(52) U.S. Cl.
CPC ......... *G06F 11/079* (2013.01); *B60R 16/0232* (2013.01); *G05B 23/0264* (2013.01)

(58) Field of Classification Search
CPC combination set(s) only.
See application file for complete search history.

(56) References Cited

U.S. PATENT DOCUMENTS 4,920,532 A * 4/1990 Wroblewski ............. H04J 3/26
370/276
5,903,426 A * 5/1999 Ehling .................. H02H 9/042
361/119

(Continued)

FOREIGN PATENT DOCUMENTS

DE    44 09 286 C1    8/1995
DE    103 01 983 A1   7/2004

(Continued)

OTHER PUBLICATIONS

English translation of International Preliminary Report on Patentability dated Jan. 7, 2014 (9 pages).

(Continued)

*Primary Examiner* — Amine Riad
(74) *Attorney, Agent, or Firm* — Crowell & Moring LLP (57) ABSTRACT

A process operates a communication network of a motor vehicle having a control device connected to a data bus. The process includes the steps of: a) determining a global supply voltage of the voltage source, b) checking whether the determined global supply voltage exceeds a specified upper voltage threshold or falls below a specified lower voltage threshold, c) providing information representing the determined global supply voltage and/or the exceeding or falling-below to control devices, d) when a fault is detected by a respective control device, checking by use of the provided information whether the global supply voltage exceeds or falls below the respective voltage threshold, and e) when an exceeding or falling-below the concerned voltage threshold by the global supply voltage is present, a respective control device, when detecting a fault, instead of information representing the detected fault, writes into its fault memory information representing the exceeding or falling-below the concerned voltage threshold by the global supply voltage as a possible cause of the fault.

13 Claims, 4 Drawing Sheets

(51) Int. Cl.
*G05B 23/02* (2006.01)
*B60R 16/023* (2006.01)

(56) References Cited

U.S. PATENT DOCUMENTS

| | | | | |
|---|---|---|---|---|
| 6,167,321 | A * | 12/2000 | Chan | H03K 19/00315 |
| | | | | 327/143 |
| 6,456,473 | B1 * | 9/2002 | Olson | H02H 3/087 |
| | | | | 361/111 |
| 6,510,485 | B1 * | 1/2003 | Shin | G06F 1/266 |
| | | | | 710/305 |
| 7,262,945 | B2 * | 8/2007 | Galang | H02H 3/207 |
| | | | | 361/90 |
| 7,508,643 | B2 * | 3/2009 | Shreiner | H04L 12/40 |
| | | | | 361/117 |
| 7,616,108 | B2 * | 11/2009 | Shank | B60Q 1/0076 |
| | | | | 340/458 |
| 8,111,037 | B2 * | 2/2012 | Zhang | H01M 10/486 |
| | | | | 320/104 |
| 8,129,981 | B2 * | 3/2012 | Bolz | H04B 3/30 |
| | | | | 324/117 H |
| 8,610,382 | B2 * | 12/2013 | Goldammer | B60L 1/003 |
| | | | | 318/139 |
| 8,824,115 | B2 * | 9/2014 | Le Brun | H02H 11/006 |
| | | | | 361/90 |
| 9,059,655 | B2 * | 6/2015 | Trunk | B60L 3/0061 |
| 2004/0251743 | A1 * | 12/2004 | Sadowski | B60R 16/0315 |
| | | | | 307/10.1 |
| 2005/0267728 | A1 * | 12/2005 | Maher | G06F 13/387 |
| | | | | 703/25 |
| 2007/0180318 | A1 | 8/2007 | Morozumi | |
| 2008/0179965 | A1 * | 7/2008 | Paillet | H02M 1/081 |
| | | | | 307/125 |
| 2008/0238192 | A1 * | 10/2008 | Hashimoto | H02J 1/14 |
| | | | | 307/10.1 |
| 2009/0190273 | A1 * | 7/2009 | Moran | B60K 6/28 |
| | | | | 361/16 |
| 2009/0248238 | A1 | 10/2009 | Itoh | |
| 2010/0008004 | A1 * | 1/2010 | Galang | H02H 3/207 |
| | | | | 361/59 |
| 2010/0185888 | A1 | 7/2010 | Hahn et al. | |
| 2011/0175619 | A1 * | 7/2011 | Bauer | B60L 3/0069 |
| | | | | 324/510 |
| 2013/0107408 | A1 * | 5/2013 | Le Brun | H02H 11/006 |
| | | | | 361/90 |
| 2014/0239364 | A1 * | 8/2014 | Huang | H01L 29/66174 |
| | | | | 257/312 |
| 2015/0239364 | A1 * | 8/2015 | Baughman | G07C 5/0841 |
| | | | | 701/33.4 |

FOREIGN PATENT DOCUMENTS

| | | |
|---|---|---|
| DE | 103 06 553 A1 | 9/2004 |
| DE | 10 2004 023 084 B3 | 6/2005 |
| DE | 10 2005 038 130 A1 | 2/2007 |
| FR | 2 934 389 A1 | 1/2010 |
| JP | 7-245786 A | 9/1995 |
| JP | 2005-88676 A | 4/2005 |
| JP | 2007-46546 A | 2/2007 |
| JP | 2007-112303 A | 5/2007 |

OTHER PUBLICATIONS

German Search Report with English translation dated Mar. 5, 2012 (ten (10) pages).

International Search Report dated Sep. 21, 2012 with Enligsh translation (six (6) pages).

German-language Japanese Office Action issued in Japanese counterpart application No. 2014-517703 dated Jun. 21, 2016 (Six (6) pages).

* cited by examiner

DOCUMENTATION OF FAULTS IN A FAULT MEMORY OF A MOTOR VEHICLE

CROSS REFERENCE TO RELATED APPLICATIONS

This application is a continuation of PCT International Application No. PCT/EP2012/062581, filed Jun. 28, 2012, which claims priority under 35 U.S.C. §119 from German Patent Application No. 10 2011 078 793.3, filed Jul. 7, 2011, the entire disclosures of which are herein expressly incorporated by reference.

BACKGROUND AND SUMMARY OF THE INVENTION

The invention relates to a process for operating a communication network of a motor vehicle, the communication network comprising a plurality of control devices which are connected to a data bus and can exchange messages with one another by way of this data bus. The plurality of control devices are connected to a voltage source. The control devices further have a voltage measuring device for determining the voltage applied to their supply connections. Each of the control devices can access, at least in a writing manner, a central and/or internal fault memory in order to document information therein concerning a fault detected by the concerned control device. The invention further relates to a control device for a communication network of a motor vehicle as well as to a communication network of a motor vehicle.

A fault memory entry documents the original cause of a function limitation occurring in the motor vehicle. This means that every fault memory entry is cause-related. A fault memory entry may be caused, for example, by a message received from another control device if the message itself or the content of the message does not correspond to the usual demands on the data format, the value range, etc. Fault memory entries are, for example, also generated when the voltage applied to a control device falls below a specified voltage threshold. This condition is called undervoltage.

For this purpose, each control device determines the voltage applied to its supply connection and checks whether there is an undervoltage. As a function of the determined voltage, each control device itself decides whether it can offer the functions provided by it. If this is not so, a failure will be documented in the fault memory. Missing messages from other control devices transmitted by way of the data bus are not documented in the fault memory in the event of undervoltage. Instead, only the fault memory entry representing the undervoltage will be kept available in the fault memory.

This leads to the problem that, when the motor vehicle is checked in a shop, the cause of the fault memory entry characterizing the undervoltage cannot be precisely recognized. In particular, it cannot be differentiated whether a defect is present at the control device, at a plug, at a cable, at a connection to a reference potential, at a communication partner or at an energy storage device of the motor vehicle. Expenditures and costs are therefore necessary in order to find the fault. This frequently has the result that the control device having the fault memory entry will be exchanged, which is connected with high costs.

It is an object of the invention to indicate a process which makes it possible to determine the cause of the fault in a simpler and more reliable fashion by means of a fault memory entry. It is a further object of the invention to indicate a corresponding computer program product, a control device as well as a communication network for a motor vehicle, which allow the implementation of the process.

These and other objects are achieved by a process according to the invention, a computer program product according to the invention, a control device according to the invention and a communication network according to the invention. Advantageous embodiments are described herein.

The invention provides a process for operating a communication network of a motor vehicle, the communication network comprising a plurality of control devices which are connected to a data bus and can exchange messages with one another by way of this data bus. The plurality of control devices are connected to a voltage source and have a voltage measuring device for determining the voltage applied to their supply connections. Furthermore, the plurality of control devices can access, at least in a writing manner, a central and/or internal fault memory in order to document information therein concerning a fault detected by the concerned control device.

The process comprises the following steps:
a) determining the global supply voltage of the voltage source;
b) checking whether the determined global supply voltage exceeds a specified upper voltage threshold or falls below a specified lower voltage threshold;
c) providing information representing the determined global supply voltage and/or the exceeding or falling-below to the control devices;
d) when a fault is detected by a respective control device, checking by use of the provided information whether the global supply voltage exceeds or falls below the respective voltage threshold;
e) when an exceeding or falling-below the concerned voltage threshold by the global supply voltage is present, a respective control device, when detecting a fault, instead of information representing the detected fault, will write into its fault memory information representing the exceeding or falling-below the concerned voltage threshold by the global supply voltage as a possible cause of the fault.

The central distribution of the actual voltage situation of the voltage source (battery) of the motor vehicle makes it possible to better distinguish the cause of a fault memory entry. Particularly consequential faults of communication problems in the case of global undervoltage are explicitly identified by way of a fault memory entry characterizing the global undervoltage. This points in the direction of the battery voltage but does not result in repair instructions with respect to the control device. Only true faults at the control device, the plug or at the cable harness are attributed to a control device itself. This results in a simplified fault diagnosis. In addition, costs can be saved when the vehicles are repaired.

According to an advantageous further development, the determination of the supply voltage of the voltage source in Step a) and/or the checking whether the determined global supply voltage exceeds the specified upper voltage threshold or falls below the specified lower voltage threshold (Step b)) takes place in a central fashion. The providing of the information according to Step c) to the control devices takes place by way of a message transmitted by way of the data bus. The central detection of the global voltage constructively is not only simple but also makes it possible to measure the voltage with the greatest-possible precision. In particular, it is useful for the control device measuring the global voltage to be connected directly to the voltage source and/or to be arranged in the immediate spatial proximity of the voltage source.

It is further advantageous for Steps b) and c) to be carried out in cyclical intervals. This has the result that even when there is no exceeding of or falling below the threshold values, corresponding information is provided to the control devices. By way of the control devices receiving the information, when the information does not arrive, it can thereby be concluded that there is a defect of the central control device or the data bus communication. The implementation of Steps b) and c) at cyclical intervals thereby increases the certainty of the diagnosis of faults and the correctness of the resulting fault memory entries.

According to a further useful development, by way of a respective control device, when an internal fault caused by the control device is detected, aa) it is determined before Step d) whether a determined local supply voltage exceeds a specified upper voltage threshold or falls below a specified lower voltage threshold;

bb) it is checked whether the condition in Step e) has been met;

cc) when it is determined that Step e) has not been met, when detecting the internal fault caused by the control device, instead of information representing the detected fault, information representing the exceeding or the falling below the concerned voltage threshold by the local supply voltage is written as a possible cause of the internal fault into the fault memory.

This further development permits a differentiation between faults which could have been caused by a global or local over- or undervoltage. This further improves the precision of the fault diagnosis.

In a further advantageous development, the providing of information representing the determined global supply voltage and/or the exceeding or falling-below to the control devices takes place by use of a message transmitted by way of the data bus in a bit string, in which the setting of a flag at a specified point of the bit string signals the exceeding or falling below the concerned voltage threshold by the global voltage supply.

The providing of the determined global supply voltage should be equated with the analog transmission of the measured voltage. This has the result that Step b) can then be carried out by the control devices themselves. This means concretely that the checking whether the determined global supply voltage exceeds a specified upper voltage threshold or falls below a specified lower voltage threshold is carried out by the control devices.

In contrast, the transmission of the information to the control devices in a bit string has the advantage that the evaluation of the exceeding of or falling-below takes place by the control device carrying out the measurement. In the case of a change of the voltage thresholds, it is therefore sufficient to provide this change only in the control device carrying out the voltage measurement. The latter variant therefore offers administrative advantages.

The invention further provides a computer program product which can be loaded directly into the internal memory of a digital control device and comprises software code sections by which the following steps can be carried out when the product is running on the control device of a communication network of a motor vehicle:

a) receiving information representing a centrally determined global supply voltage and/or an exceeding of a specified upper voltage threshold or a falling-below a specified lower voltage threshold;

b) when a fault is detected by the control device, a checking by use of the provided information is carried out as to whether the global supply voltage exceeds or falls below the respective voltage threshold;

c) when an exceeding or falling-below the respective voltage threshold by the global supply voltage is present, the control device, when detecting a fault, instead of information representing the detected fault, will write into its fault memory information representing the exceeding or falling-below the respective voltage threshold by the global supply voltage as a possible cause of the fault.

In a further advantageous embodiment, the computer program product is further designed for implementing further steps of the above-described process.

The invention further provides a control device for a communication network, the communication network comprising a plurality of control devices which are connected to a data bus and can exchange messages with one another by way of this data bus. The control device is connected to a voltage source and has a voltage measuring device for determining the voltage applied to its supply connections. The control devices can access, at least in a writing manner, in each case, a central and/or internal fault memory in order to document information therein concerning a fault detected by the respective control device. The control device is designed for implementing the following steps:

a) receiving information representing a centrally determined global supply voltage and/or an exceeding of a specified upper voltage threshold or a falling-below a specified lower voltage threshold;

b) when a fault is detected by the control device, to carry out a checking by use of the provided information as to whether the global supply voltage exceeds or falls below the respective voltage threshold;

c) when an exceeding or falling-below the respective voltage threshold by the global supply voltage is present, the control device, when detecting a fault, instead of information representing the detected fault, is to write into its fault memory information representing the exceeding or falling-below the respective voltage threshold by the global supply voltage as a possible cause of the fault.

In a further advantageous embodiment, the control device is further designed for implementing further steps of the above-described process.

Finally, the invention provides a communication network of a motor vehicle, the communication network comprising a plurality of control devices which are connected to a data bus and can exchange messages with one another by way of this data bus, the plurality of control devices being designed in the above-described fashion.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
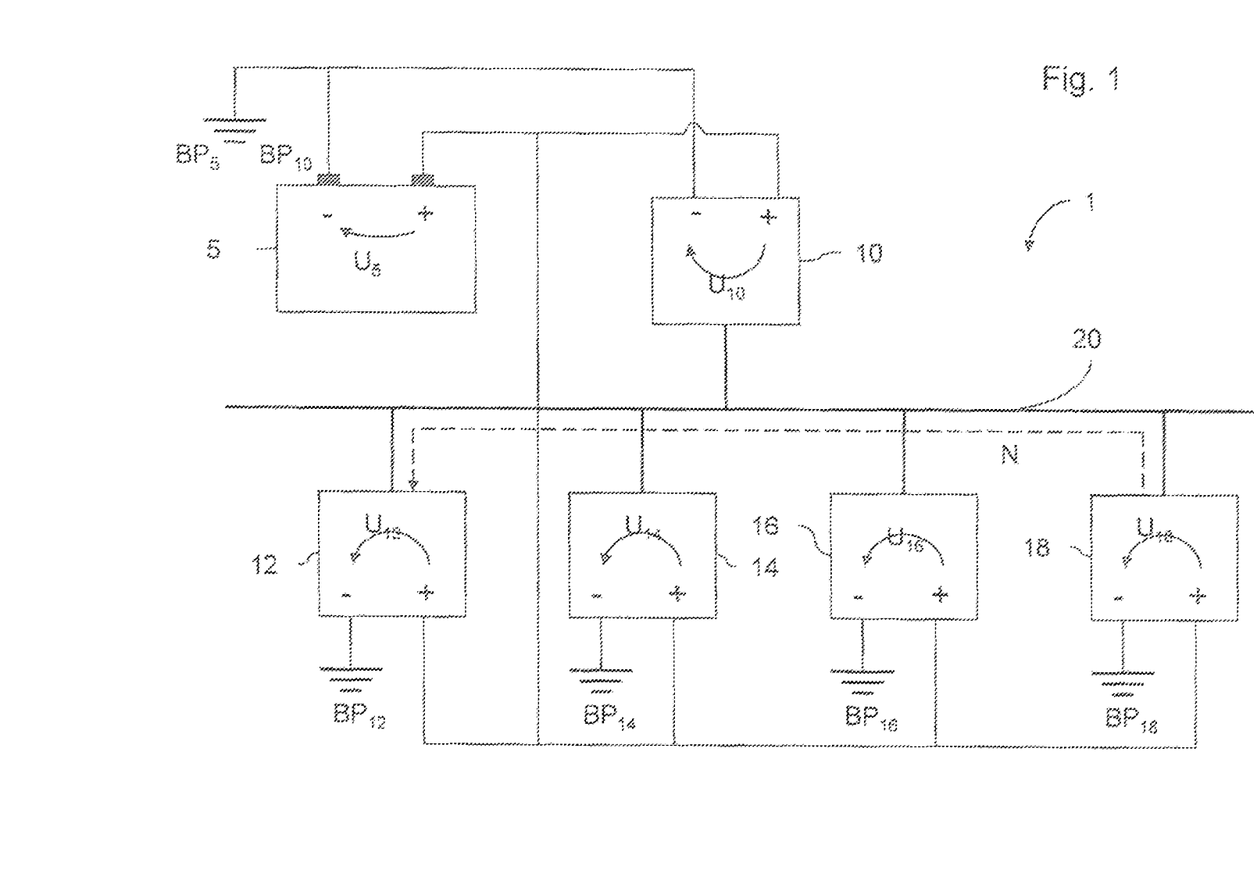
FIG. 1 is a schematic representation of an exemplary communication network according to the invention having a number of control devices.

FIG. 1 schematically illustrates an example of a communication network 1 of a motor vehicle according to the invention. The communication network 1 includes, for example five control devices 10, 12, 14, 16, 18 which are each connected to a data bus 20 and can exchange messages by way of the latter. The control device 10 represents a central control unit (electronic control unit, as, for example, a digital engine management). The remaining control devices 12, 14, 16, 18 are control devices which can be used, for example, for controlling an adaptive chassis. Actuators and sensors required for this purpose will not be shown for reasons of simplicity. However, in principle, the control devices connected to the data bus 20 may also have a different arbitrary function.

A voltage source 5 (battery or accumulator) is also shown which has a positive ("+") and a negative ("−") supply connection. A supply voltage $U_5$ is applied between the positive and the negative supply connection. The negative supply connection is connected with a reference potential, as a rule, a vehicle body component. In FIG. 1, this is identified by the reference symbol $BP_5$.

Respective positive ("+") supply connections of the control devices 10, 12, 14, 16, 18 are connected with the positive simply connection of the voltage source 5. The negative ("−") supply connection of the control device 10, i.e. its reference potential connection, is connected directly with the negative supply connection of the battery 5. The negative supply connections ("−") of the control devices 12, 14, 16, 18, as a rule, are coupled with a vehicle body component situated in their proximity, so that these have a respective reference potential of $BP_{12}$, $BP_{14}$, $BP_{16}$ and $BP_{18}$. Because all vehicle body components are electrically connected with one another, the reference potential $BP_5$, $BP_{12}$, $BP_{14}$, $BP_{16}$ and $BP_{18}$ are theoretically identical. Because of the different electric conductivity of individual vehicle body areas, however, a different reference potential may occur in practice.

Each of the control devices 10, 12, 14, 16, 18 has a voltage measuring device (not shown in detail) for determining the voltage $U_{10}$, $U_{12}$, $U_{14}$, $U_{16}$, $U_{18}$ applied to their supply connections. Because of the above-mentioned actual different reference potentials as well as the voltage decreasing with an increasing distance from the positive supply connection of the battery, the control devices 10, 12, 14, 16, 18 have an actually different local supply voltage $U_{10}$, $U_{12}$, $U_{14}$, $U_{16}$, $U_{18}$.

The operability of the communication network 1 will be guaranteed as long as no undervoltage is present. Undervoltage means that the respective local supply voltage $U_{10}$, $U_{12}$, $U_{14}$, $U_{16}$, $U_{18}$ of the control devices 10, 12, 14, 16, 18 is lower than a low local voltage threshold. As a rule, an undervoltage will be present if the local supply voltage is less than 9 V. Although below this voltage, the processors of the control devices and the data bus will typically continue to operate, so that a communication can still take place under certain circumstances between the control devices, also under certain circumstances, sensors or actuators linked to the control device can no longer operate as intended below the low local voltage threshold, so that the measured values obtained from them will be faulty.

Correspondingly, an upper local voltage threshold for each of the control devices 10, 12, 14, 16, 18 is defined for a so-called local overvoltage. An overvoltage will be present if the local supply voltage $U_{10}$, $U_{12}$, $U_{14}$, $U_{16}$, $U_{18}$ between the supply connections is higher than 16 V. For a certain time period, for example, 200 ms, the voltage may amount to 18 V. Above the indicated voltage limits, the control devices could be damaged or destroyed. Such a situation may occur, for example, when, for the purpose of a starting assistance, the motor vehicle is connected with the battery of another vehicle, particularly of a truck.

Furthermore, each of the control devices 10, 12, 14, 16, 18 has a fault memory not shown in detail, into which information can be written concerning a fault detected by the respective control device. Such an entry is called a fault memory entry and documents the original cause of a function limitation of the control device. Therefore, in order to be able to find the cause of the fault, a fault memory entry will always be cause-related. In a modification, a central fault memory could be provided into which the control devices can write determined faults.

A fault memory entry will always be in a local context when a fault monitoring unit contained in the respective control device 10, 12, 14, 16, 18 detects a fault and invokes a normally existing fault handling routine. However, a fault memory entry may also be caused by a limit occurring outside the respective control device. This may, for example, be a faulty measured value received from another control device which is further processed by the respective control device. An incorrectly transmitted message from a control device to the receiving control device generating the fault memory entry, will also be in the global context. Finally, those fault memory entries also will be considered to be global, in the case of which the lowering of the global supply voltage leads to a corruption of the local supply voltage.

At a supply voltage $U_5$ of more than 11 V, in the normal operation of the motor vehicle, an intended voltage supply of all control devices 10, 12, 14, 16, 18 will be ensured. When the motor vehicle has an automatic engine/motor start-stop function (MSA), a voltage of, for example, more than 8.2 V is considered to be sufficient during the starting of the engine/motor (so-called MSA start). The two above-mentioned voltage values for the global supply voltage $U_5$ each represent a lower global voltage threshold. When, in the normal operation or at the MSA start, there is a falling-below the respective voltage threshold, this may result, for example, in the case of the control device (here: control device 18) farthest away from the battery, in a local voltage corruption, i.e. the local supply voltage $U_{18}$ falls below the local lower voltage threshold value, so that the function of the control device is no longer ensured as intended. In contrast, the remaining control devices 12, 14, 16 can still be operated within their permissible voltage range because of their closer spatial proximity to the battery 5.

In such a situation, a message N of the control unit 18 expected, for example, by the control device 12 will either fail, or it is possible that the control device 18 will still be able to send a message to the control device 12 but the information contained therein will be faulty. In order to prevent that the control device 12, because of the fault detected by it, generates a fault memory entry in its fault memory which represents information concerning the failing of the message or a faulty message, the invention provides the inclusion of information concerning the global supply voltage $U_5$ of the battery of the motor vehicle.

The courses of the process described in the following FIGS. 2 to 6 are based on the principle of a central voltage measuring and monitoring concerning the exceeding or falling-below of the upper and lower global voltage threshold. The central voltage measuring takes place by the control device 10, which is arranged in the direct spatial proximity to the battery 5 and is connected directly with the supply connections of the battery. Likewise, a battery monitoring unit assigned to the battery 5 could take over the voltage measuring function.

Preferably, it can be checked after the voltage measuring by the control device 10 whether the measured global supply voltage $U_5$ exceeds the specified upper voltage threshold or falls below the specified lower voltage threshold. A corresponding information of the result will be transmitted by way of a message transmitted via the data bus 20 to all control devices, here: 12, 14, 16, 18, connected to the data bus 20. Preferably, it is not the measured voltage that is transmitted directly in the message but a bit string, in which the setting of a flag at the specified point of the bit string signals the exceeding or falling-below of the respective threshold value by the global voltage supply. For example, bit 1 signals a detected global undervoltage for the normal operation (i.e. a falling below the voltage of 11 V). Bit 2 signals, for example, an undervoltage during the MSA start, i.e. a falling below the voltage of 8.2 V. Bit 3 signals, for example, an overvoltage, in which case a voltage of 16 or 18 V is exceeded for more than 200 ms. In order to take into account the dynamics taking place in the onboard energy supply system, the corresponding voltage thresholds may be provided with a hysteresis When a fault is detected, the control devices detecting the fault carry out a local evaluation of the information available about the global battery voltage, in which case, the global supply voltage is taken into account as a possible cause of the occurred fault. As a result, it becomes possible to implement a cause-related and unambiguous fault memory entry as a function of the context of the control device, when the fault is occurring.

Figure 2:
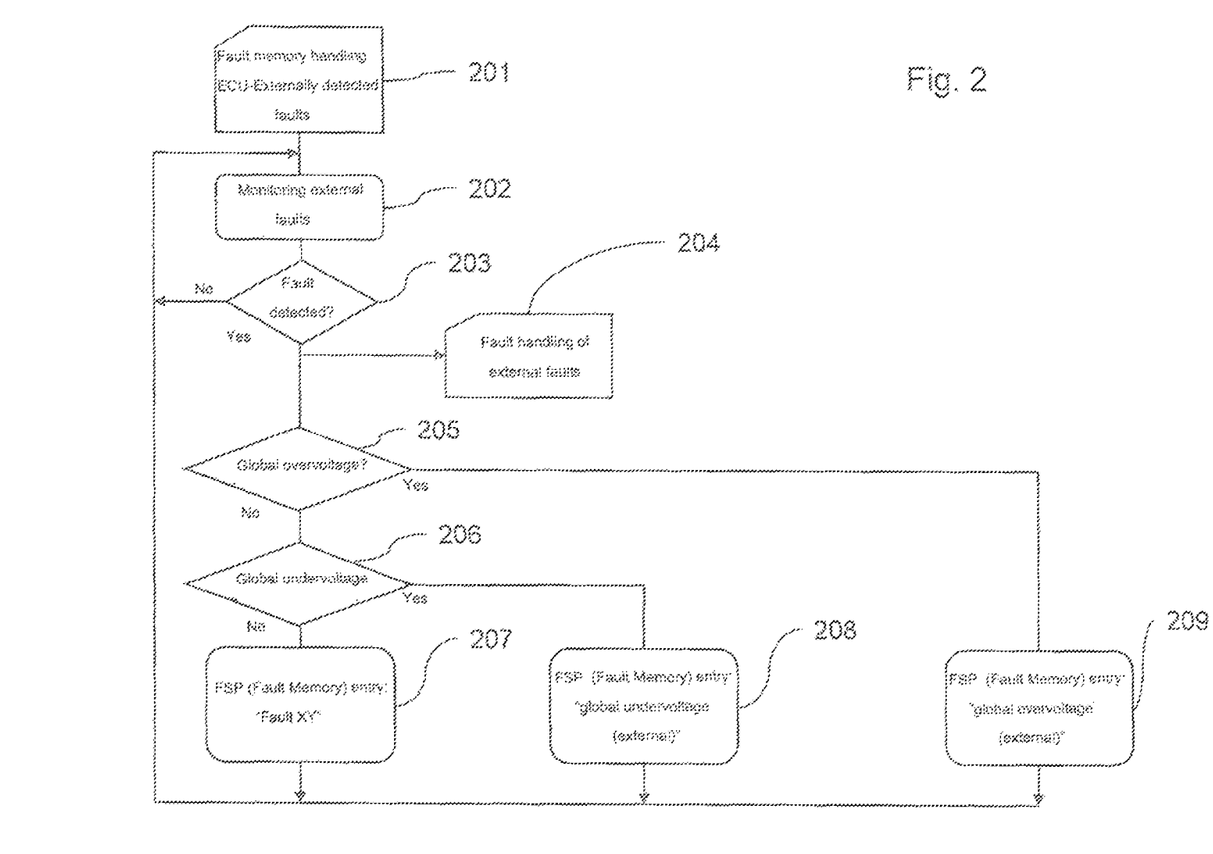
FIG. 2 is a schematic representation of an exemplary flow of the process according to the invention in a control device in the case of an external fault.
Figure 3:
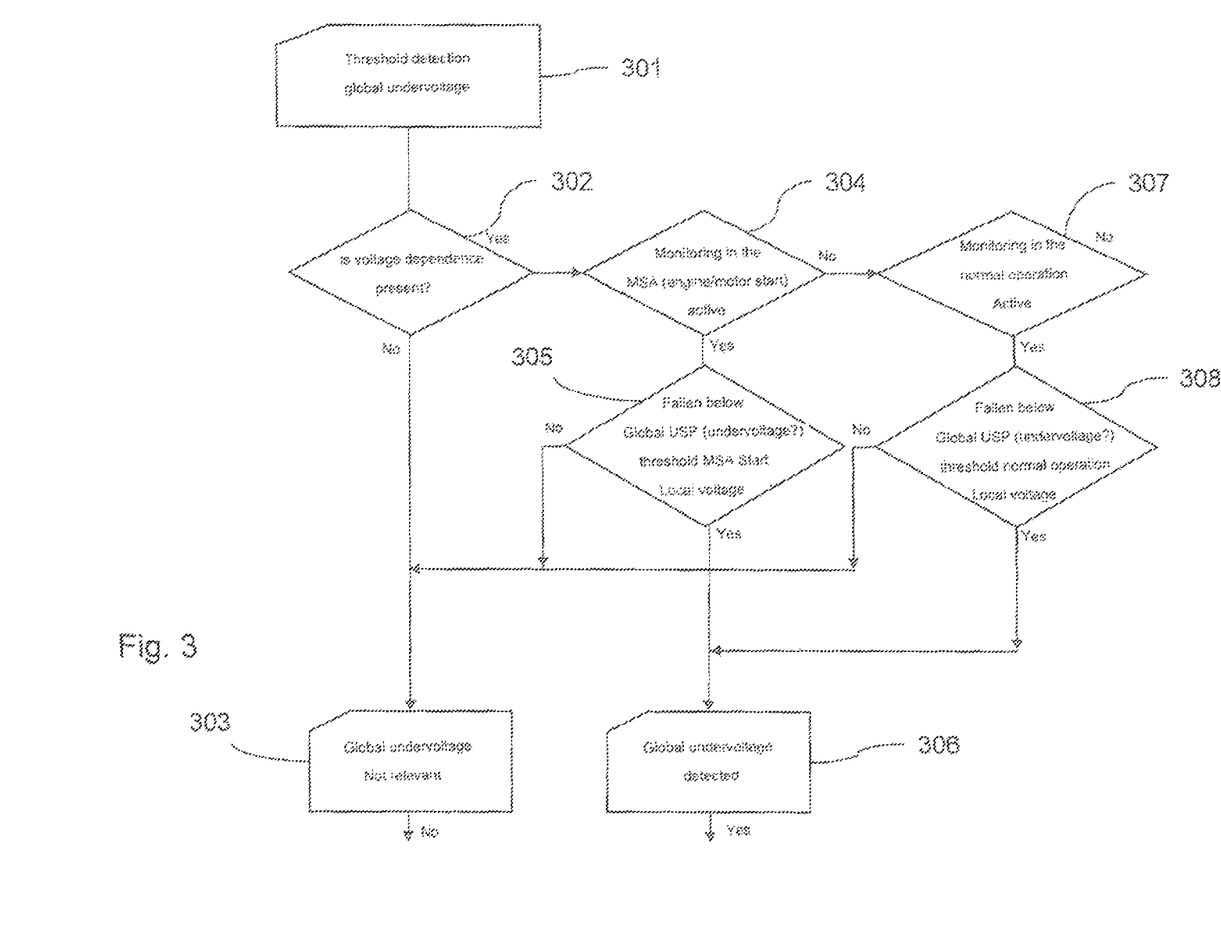
FIG. 3 is a schematic representation of a step of the flow of the process of FIG. 2.
Figure 4:
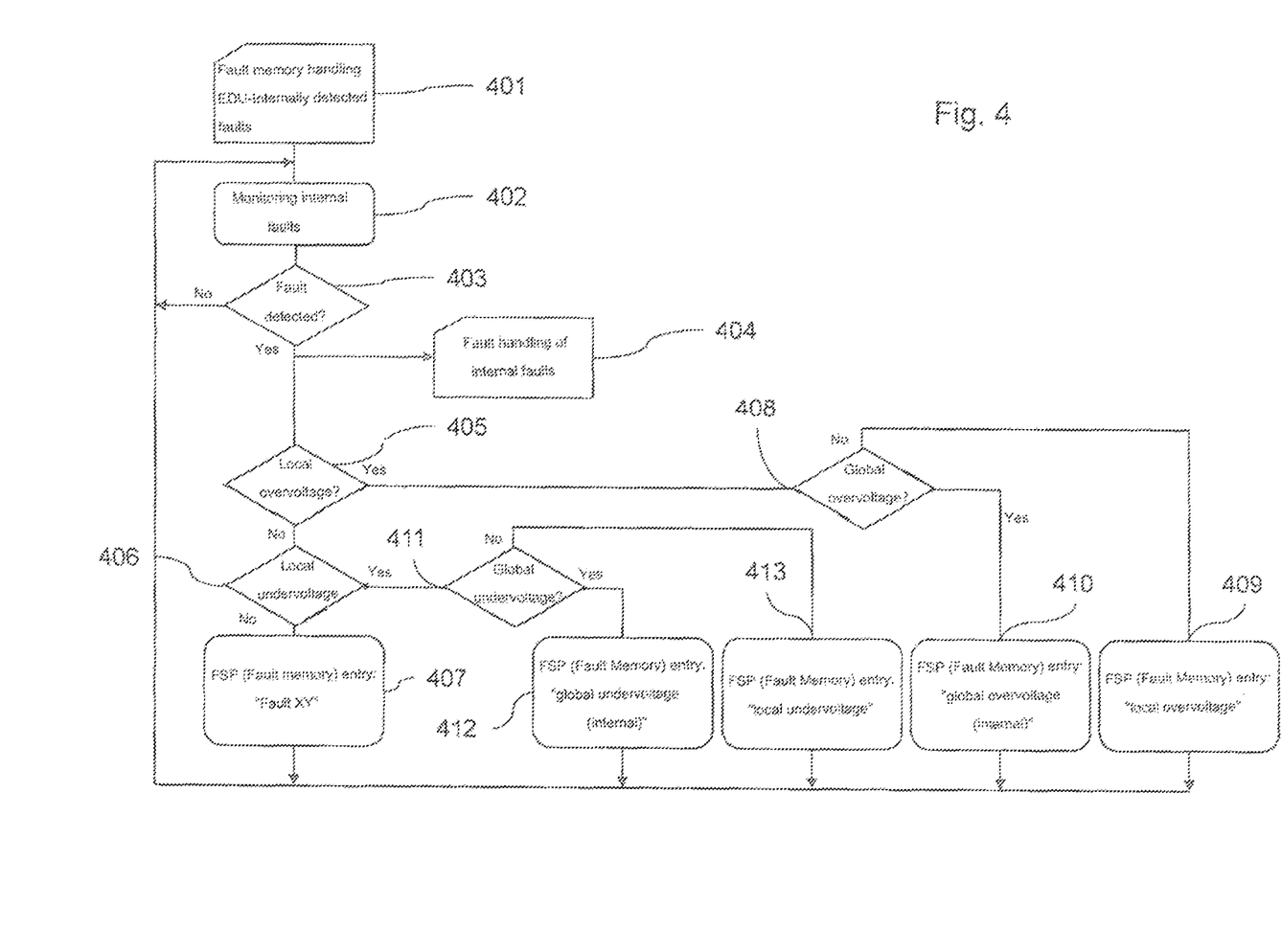
FIG. 4 is a schematic representation of an exemplary flow of the process according to the invention in a control device in the case of an internal fault.

FIGS. 2 to 4 now illustrate in detail the check implemented in a respective control device as a function of whether the fault recognized by the control device is caused outside the control device or in the control device itself.

In this context, external faults essentially are network faults, such as invalidities, or external faults requiring the monitoring of useful-signal qualification markings, etc. Other external faults, such as a monitoring of a signal that is physically transmitted by way of a dedicated line, or the like, are also contemplated. Basically, in the case of external faults, nothing needs to be repaired directly on the entering component or its periphery. Internal faults are faults which are assigned to monitored elements in the control device (for example, a sensor). The invention involves those internal faults that have a voltage dependency, thus may apply in the case of undervoltage, although the monitored elements are not defective.

FIG. 2 illustrates the course of a fault memory entry in the case of a fault occurring outside the control device implementing the process, for example, a failing or a faulty message (Step 201). Such a fault may, for example, be caused by an undervoltage in the sending control device. In Step 202, a monitoring with respect to an external fault of the above-mentioned type takes place. If a fault was detected in Step 203, a specified fault handling of the external fault will take place in Step 204. It is further checked in Step 205 whether the global supply voltage $U_5$ has exceeded the specified upper threshold value. The checking takes place by evaluating the bit string transmitted by the control device 10 at cyclical intervals. If a violation of the threshold value is present, a fault memory entry ("global overvoltage (external)") takes place in Step 209, which signals a global overvoltage because of an external fault. If the global supply voltage $U_5$ does not exceed the specified upper global voltage threshold value, a check takes place in Step 206 as to whether the global supply voltage $U_5$ is falling below the lower global voltage threshold. The detailed course of the process implemented in this case will be described more precisely in connection with FIG. 3. The detection of a global undervoltage by the control device, in turn, takes place by evaluating the bit string transmitted by the control device 10 to the remaining control devices. If a global undervoltage is present, in Step 208, a fault memory entry is written into the fault memory, which signals a global undervoltage because of a fault resulting outside the control device ("global undervoltage (external)"). If no global undervoltage is present, a fault memory entry will be generated in Step 207, which represents the detected fault.

FIG. 3 illustrates the process of checking whether a global undervoltage is present. In this case, it is first checked in Step 302 whether fault determined by the control device can have a voltage dependence. This differentiation is necessary because, in a motor vehicle, some messages or measured signals are independent of a voltage of the battery. A voltage-independent monitoring is, for example, a ROM monitoring, in which case a detected fault always is to be written in the fault memory. If there is no voltage dependence, the checking of the global undervoltage will not be relevant (Step 303), so that, in the course according to FIG. 2, the continuation takes place with Step 207. In contrast, if there is a voltage dependence, first a selection takes place in Steps 304 and 307 of the actually valid lower global voltage threshold. In Step 304, it is checked whether an MSA start is active. If that is not so, a normal operation is present, which is further treated in Step 307. As a function of the now valid lower voltage threshold (8.2 V for Step 304 as well as 11 V for Step 307), it is checked in Steps 305 and 308 whether there is a falling below the respectively valid threshold or the local voltage has fallen below a local voltage threshold of 6.8 V or 9 V. The latter can, for example, take place by a measuring of the supply voltage $U_{12}$ of the control device 12. By the alternative consideration of the global voltage threshold or of the local voltage threshold, the circumstance is to be taken into account that, under certain circumstances (for example, a short circuit in the spatial proximity of the control device), it may happen that, for example, the voltage $U_{12}$ of the control device drops faster than at the battery at which this brief problem will possibly not be measurable at all. In such cases, it can be concluded because of the low bottom local voltage threshold value that also other control devices are not being sufficiently supplied and that, also in this case, a global problem is occurring, even if this cannot be recognized by the voltage measured by the control device 10. In the event that there was a falling-below one of the above-mentioned thresholds in Step 305 or 308, a global undervoltage was recognized (Step 306). The further process according to the course of FIG. 2 follows the "yes" path. Otherwise, the continuation takes place with Step 303.

FIG. 4 shows the course in a control device when a control-device-internal fault was recognized (401). In Step 402, a monitoring takes place with respect to an internal fault. If no fault was recognized in Step 403, Step 402 will start again. If a fault was detected in Step 403, a treatment of the internal fault takes place in Step 404. Simultaneously, it is checked whether there is a local overvoltage (Step 405). In this case, an upper local voltage threshold value is compared with the local supply voltage ($U_{12}$, $U_{14}$, $U_{16}$, $U_{18}$) measured by the control device. If a local overvoltage is present, it is checked in Step 408 whether information is present concerning a global overvoltage. If this is not so, a fault memory entry takes place in Step 409, which characterizes a local overvoltage ("local overvoltage"). If, in contrast, information concerning a global overvoltage is present in Step 408, a fault memory entry takes place in Step 410, which signals a global overvoltage because of an internal fault ("global overvoltage (internal)"). The information concerning the global overvoltage in Step 408, in turn, takes place by the reading-out of the bit string transmitted by the central control device 10.

If a local overvoltage could not be identified in Step 405, it is checked in Step 406 whether a local undervoltage is present. If that is not so, a fault-memory entry takes place which represents information concerning the detected fault ("fault XY"). The checking whether a local undervoltage is present, in turn, takes place by measuring the supply voltage at the terminals of the control device carrying out the checking with a lower local voltage threshold value. If a local undervoltage is present in Step 406, in Step 411, a checking will take place as to whether information is present concerning a global undervoltage. If this is so, a fault memory entry takes place which represents a global undervoltage because of an internal fault ("global undervoltage (internal)"). If no information concerning a global undervoltage is present in Step 411, a fault memory entry takes place in Step 413 which represents a local undervoltage ("local undervoltage"). A global undervoltage because of an internal fault may, for example, be a result of problems of the battery 5. A fault memory entry, which represents a local undervoltage, may point to a problem in the cabling or in the connection of the control devices to the data bus.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A process for operating a communication network of a motor vehicle, wherein the communication network comprises a plurality of control devices which are connected to a data bus and exchange messages with one another via the data bus, wherein the plurality of control devices are connected to a voltage source, have a voltage measuring device that determines a voltage applied to their supply connections, and access a central fault memory and/or internal fault memory at least in a writing manner, in order to document therein information concerning a fault detected by the corresponding control device, wherein the process comprises the steps of:
   a) determining a global supply voltage of the voltage source;
   b) checking whether the determined global supply voltage exceeds a specified upper voltage threshold or falls below a specified lower voltage threshold;
   c) providing information representing the determined global supply voltage and/or the exceeding or falling-below thereof to the control devices;
   d) when a fault is detected by a respective control device, checking by use of the provided information whether the global supply voltage exceeds or falls below a respective one of the specified voltage thresholds; and
   e) when the global supply voltage exceeds or falls below the respective one of the specified voltage thresholds, writing into a fault memory by the respective control device when detecting the fault, information representing the exceeding or falling below the global supply voltage by the respective one of the specified voltage thresholds as a possible cause of the detected fault.

2. The process according to claim 1, wherein the determining of the global voltage of the voltage source in Step a) and/or the checking of whether the determined global supply voltage exceeds the specified upper voltage threshold or falls below the specified lower voltage threshold in Step b), takes place in a central manner.

3. The process according to claim 2, wherein the determining of the global supply voltage takes place by a control device which is connected directly to the voltage source and/or is arranged in a direct spatial proximity of the voltage source.

4. The process according to claim 1, wherein the determining of the global supply voltage takes place by a control device which is connected directly to the voltage source and/or is arranged in a direct spatial proximity of the voltage source.

5. The process according to claim 1, wherein Steps b) and c) are carried out at cyclical intervals.

6. The process according to claim 4, wherein Steps b) and c) are carried out at cyclical intervals.

7. The process according to claim 1, wherein a value of the upper and/or the lower voltage threshold is selected as a function of whether a normal operation or a permitted operating condition influencing the voltages of the communication network is present.

8. The process according to claim 1, wherein, by way of a respective control device, when an internal fault caused by the control device is detected:
   aa) it is determined before Step d) whether a determined local supply voltage exceeds a specified upper voltage threshold or falls below a specified lower voltage threshold;
   bb) it is checked whether the condition in Step e) has been met;
   cc) when it is determined that Step e) has not been met, when detecting the internal fault caused by the control device, information representing the exceeding or the falling below the respective one of the specified voltage thresholds by the local supply voltage is written as a possible cause of the internal fault into the fault memory.

9. The process according to claim 1, wherein the providing of information representing the determined global supply voltage and/or the exceeding or falling-below thereof to the control devices takes place by use of a message transmitted by way of the data bus in a bit string, in which the setting of a flag at a specified point of the bit string signals the exceeding or falling below the concerned voltage threshold by the global voltage supply.

10. The process according to claim 8, wherein the providing of information representing the determined global supply voltage and/or the exceeding or falling-below thereof to the control devices takes place by use of a message transmitted by way of the data bus in a bit string, in which the setting of a flag at a specified point of the bit string signals the exceeding or falling below the concerned voltage threshold by the global voltage supply.

11. A computer program product stored in an internal memory of a digital control device and comprises software code sections by which steps are carried out when the computer program product is executed by the digital control device in a communication network of a motor vehicle, the steps comprising:

a) receiving information representing a centrally determined global supply voltage and/or an exceeding of a specified upper voltage threshold or a falling-below a specified lower voltage threshold;

b) when a fault is detected by the control device, a checking by use of the provided information is carried out as to whether the global supply voltage exceeds or falls below a respective one of the specified voltage thresholds;

c) when the global supply voltage exceeds or falls below the respective one of the specified voltage thresholds, writing into a fault memory by the respective control device when detecting the fault, information representing the exceeding or falling below the respective one of the specified voltage thresholds as a possible cause of the detected fault.

12. A control device for a communication network of a motor vehicle, wherein the communication network comprises a plurality of control devices which are connected to a data bus and exchange messages with one another by way of the data bus, wherein the control device comprises:

a voltage measuring device for determining a voltage applied to its supply connections, the control device being connected to a voltage source;

wherein the control device is configured to:

access a central fault memory and/or internal fault memory at least in a writing manner, in order to document therein information concerning a fault detected by the corresponding control device, receive information representing a centrally determined global supply voltage and/or an exceeding of a specified upper voltage threshold or a falling-below a specified lower voltage threshold;

when a fault is detected by the control device, carry out a check by use of the provided information as to whether the global supply voltage exceeds or falls below a respective one of the specified voltage thresholds; and when the global supply voltage exceeds or falls below the respective one of the specified voltage thresholds, write into a fault memory by the respective control device when detecting the fault, information representing the exceeding or falling below the respective one of the specified voltage thresholds as a possible cause of the detected fault.

13. A communication network of a motor vehicle, the communication network comprising:

a data bus;

a plurality of control devices connected to the data bus, the plurality of control devices being operatively configured to exchange messages with one another via the data bus;

a voltage source connected to the plurality of control devices;

wherein each of one or more of the plurality of control devices comprises:

a voltage measuring device for determining a voltage applied to supply connections of the control device;

a central fault memory and/or internal fault memory accessible in a writing manner in order to document therein information concerning a voltage detected by the control device; and wherein the control device is operatively configured to:

a) receive information representing a centrally determined global supply voltage and/or an exceeding of a specified upper voltage threshold or a falling-below of a specified lower voltage threshold;

b) when a fault is detected by a control device, checking by use of the received information as to whether the global supply voltage exceeds or falls below the a respective one of the specified voltage thresholds the global supply voltage exceeds or falls below the respective one of the specified voltage thresholds, write into a fault memory by the respective control device when detecting the fault, information representing the exceeding or falling below the respective one of the specified voltage thresholds as a possible cause of the detected fault.

* * * * *